No. 718,386. PATENTED JAN. 13, 1903.
T. RYAN.
YIELDING HOOF PAD.
APPLICATION FILED AUG. 20, 1902.
NO MODEL.

Witnesses:
Wilhelm Vogt
Thomas M. Smith

Inventor:
Thomas Ryan,
By J. Walter Douglas
Attorney

UNITED STATES PATENT OFFICE.

THOMAS RYAN, OF GERMANTOWN, PENNSYLVANIA.

YIELDING HOOF-PAD.

SPECIFICATION forming part of Letters Patent No. 718,386, dated January 13, 1903.

Application filed August 20, 1902. Serial No. 120,324. (No model.)

*To all whom it may concern:*

Be it known that I, THOMAS RYAN, a citizen of the United States, residing at Germantown, in the county of Philadelphia and State of Pennsylvania, have invented certain new and useful Improvements in Yielding Hoof-Pads, of which the following is a specification.

My invention has relation to that type of hoof-pad employed with calkless horseshoes and used upon the hoof to prevent slipping in frosty or damp weather upon smooth pavements; and in such connection it relates to the construction and arrangement of such a hoof-pad.

In a previous patent granted to me under date of July 29, 1902, and numbered 705,615 there is described a hoof-pad wherein the yielding or elastic body of the pad is recessed in its lower and in its upper surface and between the recess in the upper surface and the frog of the horse's hoof was interposed a sheet or layer of leather and the like, so that said frog was supported upon a bellows-like cushion.

In the present invention, which is an improvement upon the invention disclosed in said Patent No. 705,615, the elastic or yielding body of the pad is open or perforated by an opening extending through the pad at the front part of the hoof and extending rearwardly on the upper face of the pad at the rear or frog portion of the hoof, and the sheet or layer of leather is replaced by a horseshoe-shaped strip of leather, which surrounds both the main opening and the rear opening or chamber of the pad.

The nature and scope of my invention will be more fully understood from the following description, taken in connection with the accompanying drawings, forming part hereof, in which—

Figure 1:
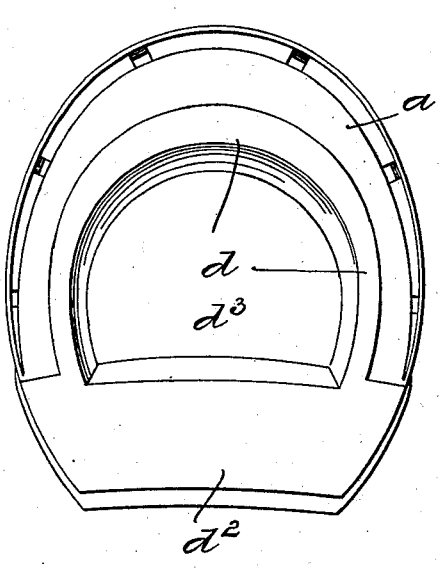
Figure 2:
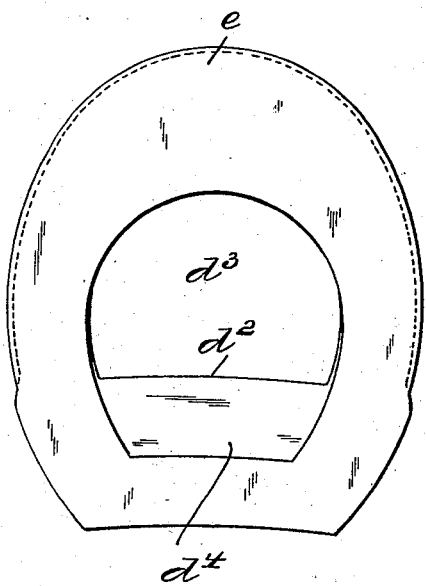
Figure 3:
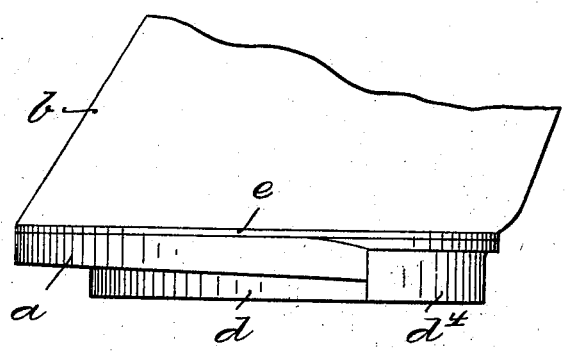
Figure 4:
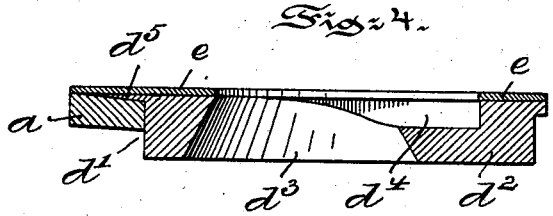

Figure 1 is an underneath plan view of a shoe and hoof-pad embodying main features of my invention. Fig. 2 is a top or plan view of the same. Fig. 3 is a side elevational view of the pad and shoe attached to a horse's hoof, and Fig. 4 is a longitudinal sectional view of the shoe and pad removed from the hoof.

Referring to the drawings, $a$ represents a horseshoe of the calkless type, and $b$ represents the horse's hoof. The elastic pad used in conjunction with the shoe $a$ consists of the main portion $d$, formed of hard rubber or other suitable elastic or yielding material, and the strip $e$, of leather or the like. The rubber portion $d$ has at its front a depression $d'$, in which the shoe $a$ fits, and at its rear the calk-like projection $d^2$. Centrally arranged in the body $d$ is an opening $d^3$, extending entirely through the body and of substantially semicircular outline. The rear calk-like projection $d^2$ has its upper face cut away, as at $d^4$, to form a chamber communicating with the main opening $d^3$. This chamber is cut into the upper face of the projection $d^2$ and extends into the calk $d^2$, away from the main opening $d^3$, as illustrated in Fig. 4. Upon the upper face of the main portion $d$ and the calk projection $d^2$ is placed the strip $e$, of leather or the like, which in outline is horseshoe-shaped and surrounds not only the opening $d^3$, but also the chamber $d^4$ in the calk $d^2$. At the front end of the rubber or similar material body $d$ is formed along the edge a fin $d^5$, which extends between the shoe $a$ and the strip $e$, of leather, the strip $e$, however, extending at this point beyond the fin $d^5$, coextensive with the outer edge of the shoe $a$.

In use the body $d$ and strip $e$ are placed against the hoof $b$, with the leather $e$ encircling the outer rim of the hoof, but leaving the frog or rear portion of the hoof $b$ free to enter the chamber $d^4$ of the calk projection $d^2$. The shoe is then secured to the leather strip $e$, fin $d$, and hoof $b$ by nails in the usual manner.

In use the hoof $b$ is practically supported upon the elastic pad at all points where the hoof is hard and non-sensitive, whereas the frog or sensitive portion of the hoof $b$ extends into the chamber $d^4$ of the calk $d^2$ and has free play therein. Air enters the chamber $d^4$ and communicates with the frog of the hoof from the main opening $d^3$. If dirt or other extraneous matter should enter the chamber $d^4$, it can readily be removed by a scraping-tool inserted through the main opening $d^3$ and the front end of the chamber $d^4$.

Having thus described the nature and ob- jects of my invention, what I claim as new, and desire to secure by Letters Patent, is—

1. A yielding or elastic hoof-pad, comprising a body of hard rubber or the like having a main opening extending centrally through the same, a calk-like projection formed on said body at the rear of the main opening, said projection having its upper face cut out horizontally to form a chamber communicating with said main opening and arranged to receive the frog of the hoof, and a strip of leather or the like encircling the main opening and said chamber and interposed between said body and hard portions of the hoof.

2. A yielding or elastic hoof-pad, comprising a body of hard rubber or the like having a fin projecting around its front edge portion, a main opening extending centrally through the body and a calk projection at the rear of said opening and having its upper face cut away horizontally to form a chamber communicating with the main opening and arranged to receive the frog of the hoof, in combination with a strip of leather or the like encircling the main opening and chamber of the body and interposed between the fin, body and calk and the hard portion of the hoof, and a calkless shoe arranged in position to bear upon the fin of the body of the pad.

In testimony whereof I have hereunto set my signature in the presence of two subscribing witnesses.

THOMAS RYAN.

Witnesses:
J. WALTER DOUGLASS,
THOMAS M. SMITH.